(12) United States Patent
Viens et al.

(10) Patent No.: US 10,225,161 B2
(45) Date of Patent: Mar. 5, 2019

(54) PRECISE STATISTICS COMPUTATION FOR COMMUNICATION NETWORKS

(71) Applicant: Accedian Networks Inc., Saint-Laurent (CA)

(72) Inventors: Yanick Viens, St-Jean-sur-Richelieu (CA); Steve Rochon, Brossard (CA); Olivier Gavinet, Pointe-Claire (CA); Gérard Auclair, Dollard-des-Ormeaux (CA)

(73) Assignee: Accedian Networks Inc., St-Laurent (CA)

( * ) Notice: Subject to any disclaimer, the term of this patent is extended or adjusted under 35 U.S.C. 154(b) by 236 days.

(21) Appl. No.: 15/338,650

(22) Filed: Oct. 31, 2016

(65) Prior Publication Data

US 2018/0123929 A1 May 3, 2018

(51) Int. Cl.
*H04L 12/24* (2006.01)
*H04L 12/26* (2006.01)

(52) U.S. Cl.
CPC ........ *H04L 41/5009* (2013.01); *H04L 41/142* (2013.01); *H04L 43/022* (2013.01); *H04L 43/08* (2013.01)

(58) Field of Classification Search
None
See application file for complete search history.

(56) References Cited

U.S. PATENT DOCUMENTS

| 6,775,301 | B1* | 8/2004 | Kroll | H04J 3/0632 |
| | | | | 370/412 |
| 9,059,816 | B1* | 6/2015 | Simpson | H04L 1/0001 |
| 2003/0099248 | A1* | 5/2003 | Speciner | H04M 3/56 |
| | | | | 370/412 |
| 2003/0126294 | A1* | 7/2003 | Thorsteinson | H04L 29/06027 |
| | | | | 709/247 |
| 2004/0216016 | A1* | 10/2004 | Olaker | G01S 5/06 |
| | | | | 714/709 |
| 2005/0226140 | A1* | 10/2005 | Zhuang | H04B 1/69 |
| | | | | 370/203 |
| 2006/0034405 | A1* | 2/2006 | Lee | G11C 27/02 |
| | | | | 375/355 |
| 2007/0046515 | A1* | 3/2007 | Lee | G11C 27/02 |
| | | | | 341/122 |

(Continued)

*Primary Examiner* — Andrew C Oh
(74) *Attorney, Agent, or Firm* — Stratford Managers Corporation

(57) ABSTRACT

A method for accurately measuring one or more network performance statistics during one or more sampling periods comprises processing a received data packet to identify flow information and time of arrival; transmitting the data packet, along with metadata comprising the flow information and the time of arrival, to a sample processing module; replaying the reception of the data packet based on the relative speed of the transmission link and the databus and the time of arrival; incrementing a number of bytes received for the data packet for a first sampling period; starting a second sampling period at a predetermined time and incrementing a number of bytes received for the data packet for the second sampling period, if the replaying is not completed. The number of bytes received for the data packet for the first and second sampling periods are processed into first and second sampling period statistics, respectively.

6 Claims, 4 Drawing Sheets

(56) References Cited

U.S. PATENT DOCUMENTS

2007/0218931 A1*  9/2007  Beadle ............... H04B 7/18589
                                                             455/502
2012/0032855 A1*  2/2012  Reede .................. G01S 5/0289
                                                             342/458

* cited by examiner

PRECISE STATISTICS COMPUTATION FOR COMMUNICATION NETWORKS

FIELD OF THE INVENTION

The present disclosure relates to networking and specifically to computing precise performance statistics for communication networks.

SUMMARY

In accordance with one embodiment, a method is provided for accurately measuring one or more network performance statistics during one or more sampling periods. The method comprises receiving a data packet at a network interface via a transmission link of a network device; processing the data packet to identify a flow information and a time of arrival; transmitting over a databus the data packet, along with a metadata comprising the flow information and the time of arrival, to a sample processing module; replaying the reception of the data packet at the network interface based on the relative speed of the transmission link and the databus and the time of arrival; incrementing a number of bytes received for the data packet for a first sampling period; starting a second sampling period at a predetermined time and incrementing a number of bytes received for the data packet for the second sampling period, if the replaying is not completed; processing the number of bytes received for the data packet for the first sampling period into a first sampling period statistics; and processing the number of bytes received for the data packet for the second sampling period into a second sampling period statistics.

The processing may be based on the flow information, and may be done within the network device or remotely from the network device. Some of the data packets may be processed within the network device, and some may be processed remotely from the network device. The replaying is done virtually based on the transmission link speed and time of arrival.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
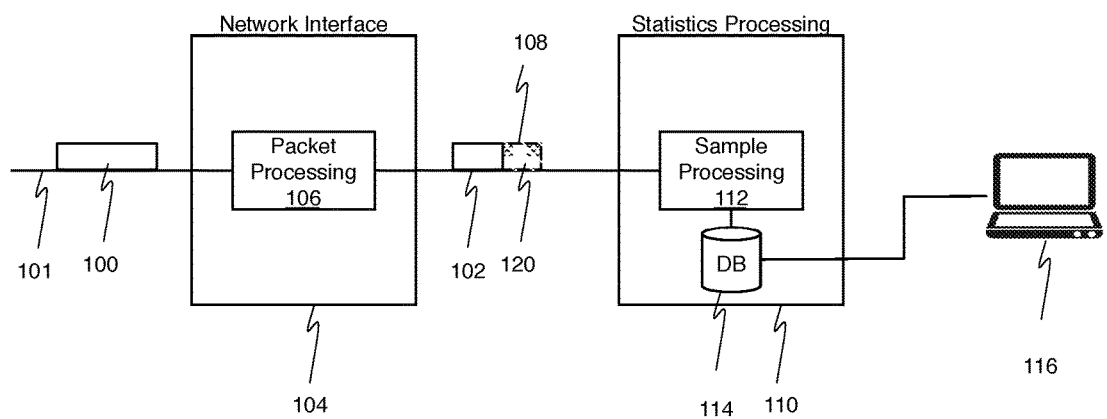
FIG. 1 is a diagram of a network device and a statistics processing engine.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Communication networks comprise several networking devices coupled together by transmission links. The communication networks carry data packets from a source application to one or more destination applications based on one or more of a plurality of layered communication protocols.

In order to continuously measure the network performance statistics of the communication network, measurement methods are applied at different points in the network. Methods for measuring performance generally include capturing data packets and computing different types of statistics such as delay, throughput, bandwidth, committed information rate, data packet size etc., over a sampling period. Sampling periods can be continuously generated, or the sampling period can be intermittent, generated at fixed or random intervals.

The precision of the statistics is critical as it may relate to verifying a service level agreement with a network customer, for example. A discrepancy in the statistics happens when a data packet arrives during the boundary of a sampling period. There is a need to improve this discrepancy.

Referring to FIG. 1, which depicts a generic network device comprising a network interface 104 terminating a transmission link 101 carrying data packets 100. The network interface 104 generally comprises a packet processing module 106 identifying the flow (flow ID) and providing a timestamp to indicate the Time of Arrival (ToA) of the data packet 100. The network interface is coupled to a statistics processing engine 110 via a databus 120. The network interface makes a copy of the data packet and transmits it, along with metadata containing the flow ID and the ToA, to a sample processing application 112 on the statistics processing engine 110. The sample processing application computes the statistics and stores the information in a database for retrieval by a network management system 116.

Figure 2:
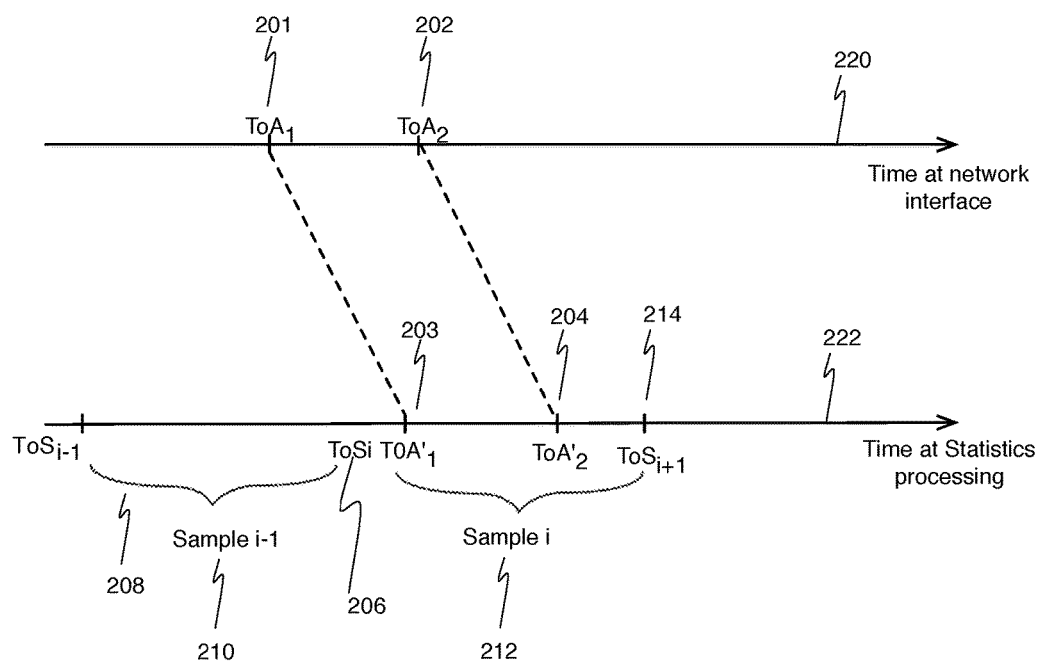
FIG. 2 is an example of a timeline of data packet arrival.

Referring to FIG. 2. An example timeline of data packet arrival is shown. At the network interface 220, the ToA of packet 1 and packet 2 is shown as $ToA_1$ 201 and $ToA_2$ 202. The data packets along with the metadata arrive at the sample processing engine 222 via the databus at time $ToA'_1$ 203 and $ToA'_2$ 204. Statistics sample i−1 210 and sample i 212 are shown on the timeline starting with $ToS_{i-1}$ 208, $ToS_i$ 206 and $ToS_{i+1}$ 214.

In the current state of the art, at the beginning of a sample i, the ToSi is set to the local clock. The results of the previous sample are saved and a new data structure is generated for this sample or counters are reset. The packet processing module 106 identifies the flow ID and computes the data packet length as the data packet comes in over the transmission link 101. Not before the end of the data packet is received and not before some intrinsic yet variable processing time can the packet processing module 106 send the associated statistics update to the statistics processing engine 110. The delay associated to the reception of the end of data packet (data packet duration) by the packet processing module 106 is variable and depends on the transmission link 101 rate and on the data packet length. The data packet statistics update hence arrives at the statistics processing engine 110 after unpredictable delay and jitter, therefore the data packets statistics may be accounted for in the wrong sample causing inaccuracies in the calculations. Furthermore, as the sampling periods get shorter in order to detect bursts more accurately on the transmission link 101, the data packet duration becomes more significant compared to the sampling period. Data packets reception over the transmission link 101 is asynchronous to the sample processing application 112. Having a single statistics update per data packet can yield to some sampling period exceeding a possible byte count, providing erroneous statistics such as a throughput greater than the actual transmission link because of this coarse asynchronous update.

In one embodiment, the sample processing module replays the packet arrival based on the relative speed of the transmission link and the databus. The ToA of the data packet (contained in the metadata) is captured by the sample processing module, and then in each valid slice of data coming in from the databus, a byte-count variable is incremented in time equivalent to the transmission link rate. The ToA is generated within the packet processing module 106 which is slaved to a synchronized Time of Day (ToD) clock source. Time synchronization can be achieved via the IEEE 1588v2 Precision Time Protocol (PTP), GPS or any other method. By replaying the packet arrival, errors due to the variable processing time in the packet processing module 106 and propagation delay on the databus 120 and the possible different clock domains and bus width changes are eliminated.

For example, with a transmission link 101 rate of 1 Gbps, and a 16-bit wide databus, each valid slice increments the byte-count by 2 bytes and the time by 16 ns. The sample processing module can then recreate what happened on the transmission link when the packet arrived and update the correct statistics for the packet.

Similar to the ToA, the ToS timers are generated within the sample processing application 112 which is slaved to a synchronized Time of Day (ToD) clock source. Time synchronization can be achieved via the IEEE 1588v2 Precision Time Protocol (PTP), GPS or any other method. Therefore the ToA and ToS values can be compared. At each ToS, the statistics computation is completed and they are saved. The statistics counters are cleared and a new sample is initiated (if continuous sampling is used). To account for the ToA to ToA' latency and ensure that data packet bytes are accounted in the right sample, a timeout mechanism is used before closing a sample. Any data packet received by the sample processing application 112 with ToA posterior to ToS closes the current sample.

In another embodiment, the sample processing module can be located remotely from the network device. For example, the processing can be done in an application on a network management system 116. Because of the replaying of the packet arrival information, the remote location of the processing module does not affect the accuracy of the statistics despite added delay and jitter.

In another embodiment, the sample processing module only needs to receive the flow identification, the packet size, the ToA and the network interface or transmission link speed. The data packet arrival is virtually replayed at the sample processing module. In this embodiment, only information about the data packet and not the actual data packet, is sent to the sample processing module for the replay to happen, which can significantly reduce the bandwidth required to send the information to the sample processing module.

In a hybrid embodiment, a sample processing module is implemented on the network device but only to manage the highest bandwidth flows. The lowest bandwidth flows are handled by a remote sample processing module. Which of the local or remote sample processing modules is used for a given flow can change dynamically based on the load of the modules, or can be determined based on programmed policies. For example, the system processes locally the flows that have a higher average number of packets per sample, and does remote processing for the flows with the lower average number of packets per sample.

Figure 3:
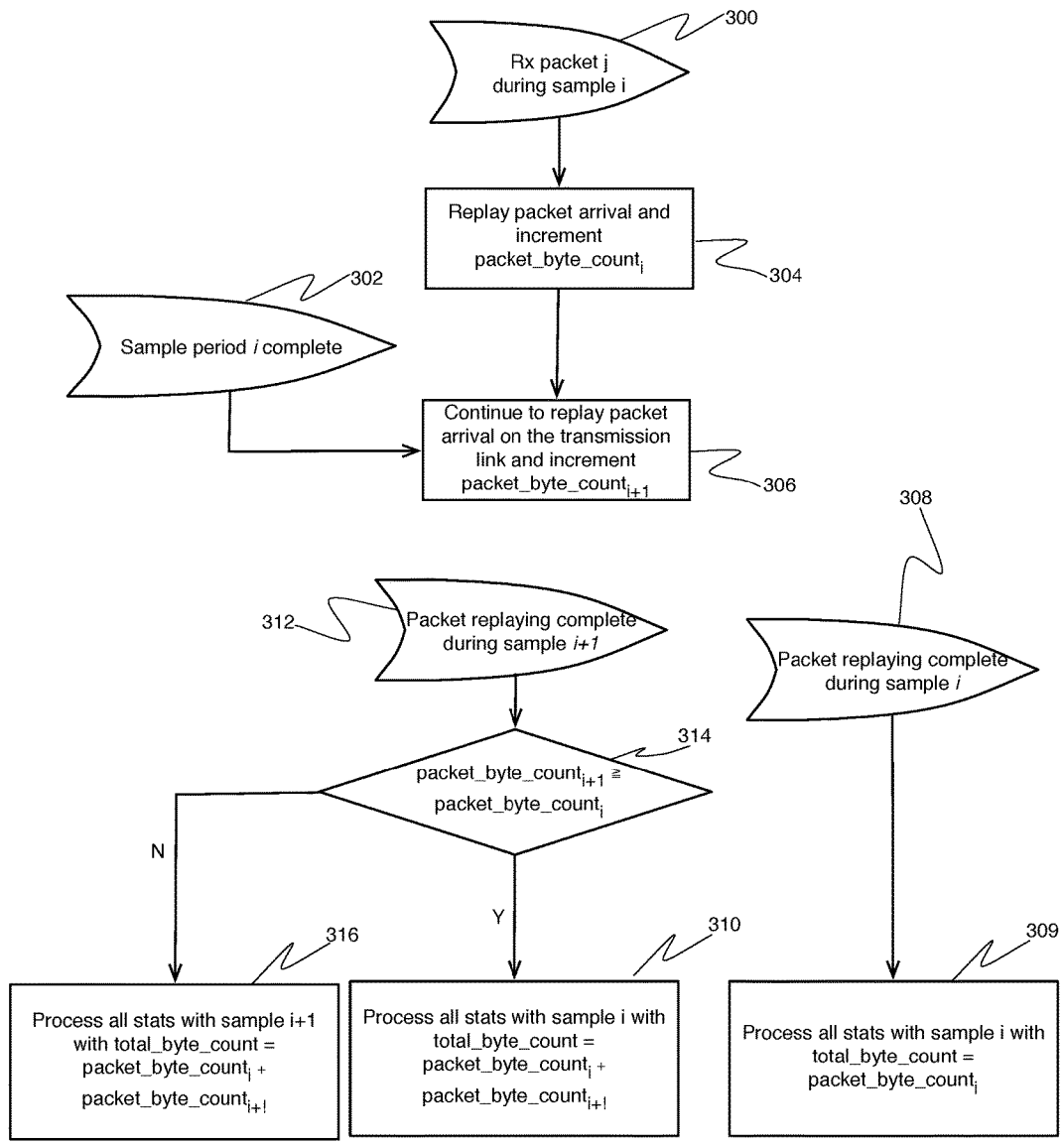
FIG. 3 is an example of a flow chart of a first embodiment allocating the packet size to the sample with the largest number of bytes.

FIG. 3 shows an example of the statistics processing upon reception of packet j during sample i 300. The ToA is retrieved and the packet_byte_count$_{ij}$ is updated at step 304 with the number of bytes arriving on the link in time equivalent to the transmission link as described above. When the sampling period i is completed at step 302 and sampling period i+1 starts, the packet_byte_count$_{(i+1)j}$ is then updated at step 306. If the replaying of the packet arrival is completed during sample i 308 (the entire packet arrived during the same sample), all statistics for the packet are processed with total_byte_count=packet_byte_count$_{ij}$ and saved in sample i 309. If the replaying of the packet arrival is completed during sample i+1 312 (only a part of the packet arrived during the same sample), the module compares if more than half of the packet had arrived in the sampling period i 314, in which case the statistics are updated with total_byte_count=packet_byte_count$_{ij}$+packet_byte_count$_{(i+1)j}$ for the sampling period i 316, otherwise, they are updated with total_byte_count=packet_byte_count$_{ij}$+packet_byte_count$_{(i+1)j}$ for the sampling period i+1 310.

Figure 4:
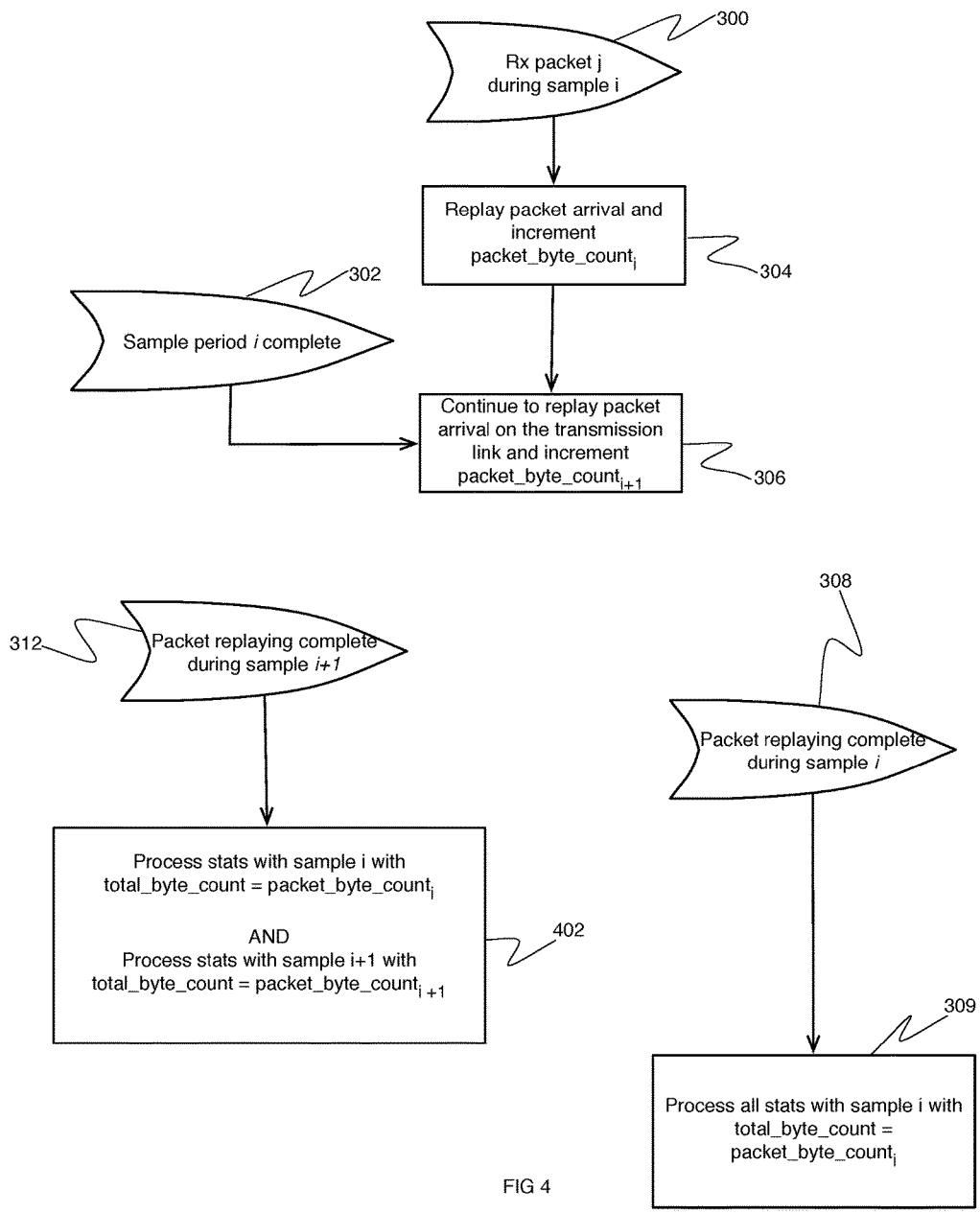
FIG. 4 is an example of a flow chart of a second embodiment splitting the packet size into each sample.

FIG. 4 shows another embodiment of the statistics processing upon reception of packet j during sample i 300. The ToA is retrieved and the packet_byte_count$_{ij}$ is updated at step 304 with the number of bytes arriving on the link in time equivalent to the transmission link as described above. When the sampling period i is completed 302 and sampling period i+1 starts, the packet_byte_count$_{(i+1)j}$ is then updated at step 306. If the replaying of the packet arrival is completed during sample i 308 (the entire packet arrived during the same sample), all statistics for the packet are processed with total_byte_count=packet_byte_count$_{ij}$ and saved in sample i 309. If the replaying of the packet arrival is completed during sample i+1 312 (only a part of the packet arrived during the same sample), the module updates the statistics for sampling period i 402, with total_byte_count=packet_byte_count$_{ij}$ and updates the statistics for the sampling period i+1 402, with total_byte_count=packet_byte_count$_{(i+1)j}$. Single reference point statistics such as delay and delay variation can be updated either sampling period i or i+1, or optionally both based on ToA.

In these two embodiments, the previous samples are not saved until the packet crossing the sample timing has completely arrived. Therefore, for slow transmission links and fast sampling, a packet arrival could span many sampling periods, and the packet_byte_count would be updated in each corresponding sampling period.

In another embodiment, the total_byte_count is incremented at the reception of the ToA in sample i. Sample i is not closed until the entire packet is received, at which point the total_byte_count (along with other statistics) is added to sample i and the sample is closed.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for accurately measuring one or more network performance statistics during one or more sampling periods, comprising:
   receiving a data packet at a network interface via a transmission link of a network device;
   processing said data packet to identify a flow information and a time of arrival;
   transmitting over a databus said data packet, along with a metadata comprising said flow information and said time of arrival, to a sample processing module;
   replaying the reception of said data packet at said network interface based on the relative speed of the transmission link and the databus and said time of arrival;
   incrementing a number of bytes received for said data packet for a first sampling period;
   starting a second sampling period at a predetermined time and incrementing a number of bytes received for said data packet for said second sampling period, if said replaying is not completed;
   processing said number of bytes received for said data packet for said first sampling period into a first sampling period statistics; and
   processing said number of bytes received for said data packet for said second sampling period into a second sampling period statistics.

2. The method of claim 1 wherein said processing is done based on the flow information.

3. The method of claim 1 wherein said replaying is done virtually based on the transmission link speed and time of arrival.

4. The method of claim 1 wherein said processing is done within the network device.

5. The method of claim 1 wherein said processing is done remotely from the network device.

6. The method of claim 1 wherein some data packets are processed within the network device and some data packets are processed remotely from the network device.

* * * * *